United States Patent [19]
Blank et al.

[11] 3,904,284
[45] Sept. 9, 1975

[54] RECHARGEABLE MAGAZINE FOR MOTION PICTURE FILM

[75] Inventors: Rudolf Blank, Cologne-Dunnwald; Achim Kluczynski, Porz-Eil, both of Germany

[73] Assignee: Agfa-Gevaert Aktiengesellschaft, Leverkusen, Germany

[22] Filed: Sept. 12, 1974

[21] Appl. No.: 505,600

Related U.S. Application Data
[60] Division of Ser. No. 417,182, Nov. 19, 1973, abandoned, which is a continuation-in-part of Ser. No. 256,913, May 25, 1972, abandoned.

Foreign Application Priority Data
[30] May 28, 1971 Germany.......................... 2126636

[52] U.S. Cl................................... 352/78 R; 352/75
[51] Int. Cl.²........................................... G03B 23/02
[58] Field of Search.......................... 352/72, 78, 75

[56] References Cited
UNITED STATES PATENTS

| | | | |
|---|---|---|---|
| 2,095,850 | 10/1937 | Wittel | 352/75 |
| 3,622,101 | 11/1971 | Sutliff | 242/101 |

*Primary Examiner*—Monroe H. Hayes
*Attorney, Agent, or Firm*—Michael S. Striker

[57] ABSTRACT

The housing of a rechargeable magazine for 8-millimeter motion picture film has two chambers one of which contains unexposed and the other of which contains exposed film. The exposed film is convoluted on a core which is rotatable in the other chamber and is coaxial with a stationary core for unexposed film. The rotary core carries an elastic pawl which normally engages one of several internal teeth in an annular internal sleeve of the housing to prevent rotation of such core in a direction to pay out the film. The rotary core further comprises a flange which overlies the pawl and has an opening through which the pawl can be reached by a tool in order to allow for deformation of the pawl so that the rotary core can be rotated in a direction to pay out exposed film. The rotary core defines with the sleeve a labyrinth seal and the opening is normally sealed by an opaque foil of elastomeric material which can be flexed by the tool in order to move a projection of the tool into engagement with a complementary projection on the elastic pawl. The housing has a removable cover which affords access to the chamber for unexposed film so that the latter chamber can be loaded with fresh film upon completed exposure of the previously inserted film. The elastic pawl can be broken off the rotary core when the latter is forcibly turned in a direction to pay out the film so that the magazine can be used in cameras which are designed to make exposures with lap dissolve, i.e., wherein the film frames which were exposed with fade-out effect must be transported rearwardly prior to renewed exposure but with fade-in effect.

7 Claims, 3 Drawing Figures

RECHARGEABLE MAGAZINE FOR MOTION PICTURE FILM

CROSS-REFERENCE TO RELATED APPLICATION

This is a division of our copending application Serial No. 417,182, filed Nov. 19, 1973. The application Ser. No. 417,182 is a continuation-in-part of the copending application Ser. No. 256,913, filed May 25, 1972 and now abandoned.

BACKGROUND OF THE INVENTION

The present invention relates to magazines or cassettes for roll film, particularly for convoluted 8-millimeter motion picture film. Still more particularly, the invention relates to magazines or cassettes of the type wherein a core for a supply of unexposed motion picture film is coaxial with a rotatable core for exposed motion picture film and the housing of the magazine comprises a blocking device which normally prevents rotation of the core for exposed film in a direction to pay out such film.

It is already known to store motion picture film in cassettes or magazines of the above-outlined character. A drawback of presently known magazines is that their housing must be destroyed in order to gain access to the supply of exposed motion picture film. This is necessary because the exposed film is confined in a chamber which is completely sealed against entry of light and also because the rotary core which supports the supply of exposed photographic film can rotate only in a direction to collect the film. It is further known to construct a magazine for motion picture film in such a way that the blocking device for the rotary core which supports the supply of exposed film in accessible upon partial destruction or breakage of one wall of the magazine housing. Reference may be had to U.S. Pat. No. 3,622,101 granted Nov. 23, 1971 to Sutliff et al. Once the blocking device is rendered inoperative, the exposed film can be withdrawn from its chamber by way of the film gate along which successive frames of film travel during exposure to scene light. In each instance, the housing of the magazine cannot be reused again so that it has to be discarded after a single use. This results in substantial waste of valuable material.

Another drawback of magazines wherein the core for exposed film cannot rotate in a direction to pay out the film is that such magazines cannot be used in cameras which are designed to make exposures with lap dissolve and wherein, to that end, the core for exposed film must be free to rotate in both directions.

SUMMARY OF THE INVENTION

An object of the invention is to provide a reusable or rechargeable magazine or cassette for roll film, particularly for 8-millimeter motion picture film.

Another object of the invention is to provide a magazine or cassette for motion picture film which is constructed and assembled in such a way that the customary blocking device which normally prevents rotation of convoluted exposed motion picture film in a direction to be withdrawn from the magazine is accessible from the outside without necessitating even partial destruction or breakage of the housing of the magazine.

A further object of the invention is to provide a novel and improved rotary core for supporting a supply of convoluted exposed motion picture film in a magazine or cassette, particularly in a magazine wherein the rotary core is mounted coaxially with a second core for a supply of unexposed motion picture film.

An additional object of the invention is to provide a convertible magazine which is furnished in a condition wherein the aforementioned blocking device prevents any rotation of the core for exposed film in a direction to pay out the film but can be rendered inoperative without necessitating the use of any tools to thereby allow for withdrawal of convoluted exposed film for the purpose of making exposures with lap dissolve.

The invention resides in the provision of a magazine or cassette (hereinafter called magazine) for roll film, particularly for 8-millimeter motion picture film. The magazine comprises a housing member which defines a chamber for a supply of convoluted film (preferably for a supply of exposed motion picture film), a core member which is rotatably mounted in the housing member to support convoluted film in the chamber, and blocking means including a first portion which is arranged to rotate with the core member and a second portion which is provided in the housing member and is located in the path of movement of the first portion to thereby prevent rotation of the core member in one direction, preferably in a direction to pay out the convoluted film. At least one portion of the blocking means is movable relative to the other portion to an inoperative position in which the first portion of the blocking means is free to bypass the second portion to thus permit a rotation of the core member in the one direction. The core member and/or the housing member has at least one opening which affords access to the one portion of the blocking means so as to enable a suitably configurated tool to reach and to move the one portion to its inoperative position whereby the film which is convoluted on the core member can be readily withdrawn from the chamber, for example, through the customary gate which registers with successive frames of unexposed motion picture film during exposure of such frames to scene light.

The second portion of the blocking means may comprise one or more internal teeth provided in the housing member, and the first portion of the blocking means then preferably comprises an elastic pawl having a pallet which is moved into engagement with and is thereby arrested by the adjacent tooth in response to rotation of the core member in the one direction. The elastic pawl preferably constitutes the one portion of the blocking means and the opening is preferably provided in the core member.

By forcibly rotating the core member in the one direction, the purchaser of the magazine can break the first portion of the blocking means away from the rotary core member and/or the second portion of the blocking means from the housing member so that the core member is thereupon free to rotate in either direction. This renders it possible to use the magazine in motion picture cameras which are designed to make exposures with lap dissolve and wherein the core for exposed film must be free to rotate in two directions.

The novel features which are considered as characteristic of the invention are set forth in particular in the appended claims. The improved magazine itself, however, both as to its construction and the mode of utilizing it, together with additional features and advantages thereof, will be best understood upon perusal of the following detailed description of certain specific embodiments with reference to the accompanying drawing.

DESCRIPTION OF THE PREFERRED EMBODIMENTS

Figure 1:
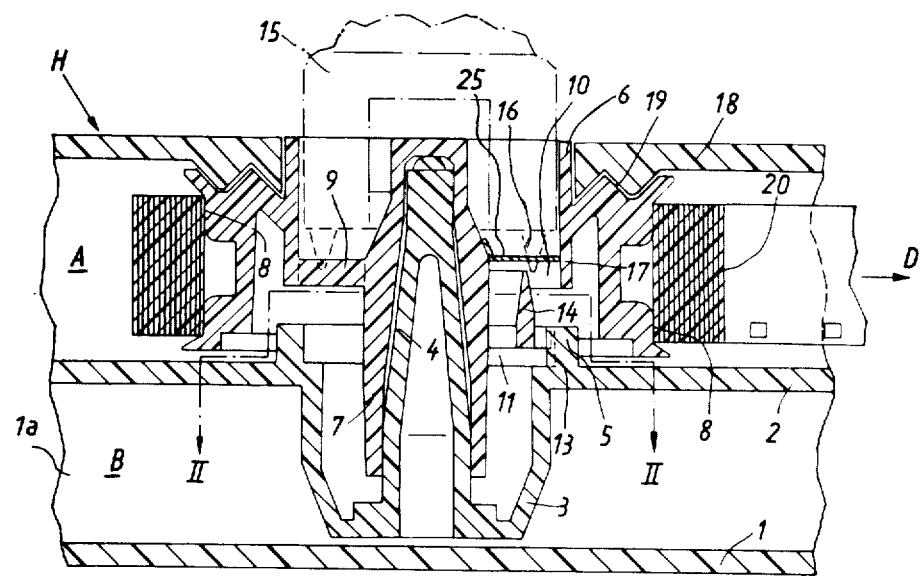
FIG. 1 is an enlarged central vertical sectional view of a magazine which embodies the invention, the section being taken in the direction of arrows as seen from the line I—I of FIG. 3.

The drawing illustrates a magazine or cassette M for a supply of exposed and unexposed motion picture film, preferably 8-millimeter motion picture film. The magazine M comprises a housing H which includes a first end wall 18, an intermediate wall or partition 2 which is preferably integral with the end wall 18, and a second end wall or cover 1 which is removably secured to the side walls 1a (only one shown in FIG. 1) of the housing H. The side walls 1a define with the walls 2 and 18 a first chamber A which is sealed against entry of light and serves to collect exposed motion picture film 20. The side walls 1a define with the walls 1 and 2 a second chamber B which serves for reception of convoluted unexposed motion picture film (not shown). When the magazine M is in use, unexposed motion picture film is being withdrawn from the chamber B and is caused to pass along a film gate in a manner well known from the art to be thereupon convoluted on a rotary core 6 which is mounted in the chamber A. The core 6 comprises a cylindrical external portion 8 which supports the innermost convolution of exposed film 20.

The intermediate wall or partition 2 is provided with an integral projection 3 which constitutes a second core and is coaxial with the rotary core 6. The core 3 extends into the chamber B to rotatably support a supply of unexposed film which is inserted into such chamber upon removal of the end wall or cover 1. As shown in FIG. 1, the central portion of the stationary core 3 has a substantially cylindrical bearing element 4 which extends through its interior and into the chamber A to rotatably support the core 6. The partition 2 is further provided with an annular portion or sleeve 5 which extends into the chamber A and is surrounded by the cylindrical portion 8 of the rotary core 6. The core 6 further comprises an inner cylindrical portion 7 having a conical blind bore which receives the bearing member 4 of the stationary core 3. The upper end portion of the bearing member 4 has a semispherical projection on which the rotary core 6 turns in response to engagement with the customary driving element of a motion picture camera into which the magazine M is inserted. The connection between the cylindrical outer portion 8 and the inner portion 7 of the rotary core 6 includes a flange 9 located in a plane which is normal to the axis of rotation of the core 6 and having at least one opening 10. The opening 10 is located above a portion of the sleeve 5, as viewed in FIG. 1, and affords access to a portion of a deformable elastic pawl 11 which is integral with or secured to the inner cylindrical portion 7 of the rotary core 6 and has a pallet 12 which normally registers with three coplanar equidistant internal teeth 13 provided in the sleeve 5. The manner in which the pallet 12 will engage the nearest tooth 13 when the core 6 is caused to rotate in a clockwise direction is shown in the upper portion of FIG. 2. The core 6 must rotate in a clockwise direction, as viewed in FIG. 2, in order to pay out the exposed motion picture film 20. The provision of the blocking device including the internal teeth 13 of the stationary sleeve 5 and the pallet 12 of the pawl 11 on the inner cylindrical portion 7 of the core 6 is desirable in order to normally prevent unwinding of exposed film 20 due to clockspringing or in response to a pull upon exposed film in the direction indicated by an arrow D shown in FIG. 1. All or nearly all parts of the illustrated magazine are preferably made of synthetic plastic material. This also includes the pawl 11 which may be made integral with or is welded or otherwise bonded to the cylindrical portion 7 of the core 6. The number of teeth 13 in the stationary sleeve 5 can be reduced to one or two or increased beyond three. When the camera mechanism causes the core 6 to rotate in a counterclockwise direction, as viewed in FIG. 2, the pallet 12 of the pawl 11 merely rides over successive teeth 13 without in any way interfering with such rotary movement of the core 6 and the supply of exposed film 20.

The pawl 11 is provided with a substantially wedge-shaped upwardly extending projection 14 which is adjacent to its pallet 12 (i.e., the projection 14 is remote from that end of the pawl 11 which is secured to the portion 7 of the core 6). The projection 14 extends into the opening 10 of the flange 9 and can be engaged by the complementary projection 16 of a suitable tool 15 which can be inserted into the upper part of the core 6 so that the projection 16 enters the opening 10 and thereby engages the projectioni 14 in order to flex the pawl 11 downwardly, as viewed in FIG. 1. The pallet 12 is then out of register with the teeth 13 of the sleeve 5. This allows for withdrawal of exposed photographic film 20 from the chamber A in the direction indicated by the arrow D, for example, through the aforementioned film gate in one side wall 1a of the housing H. Thus, the housing H need not be destroyed in order to afford access to the exposed film 20. When the magazine M with exposed film 20 in the chamber A is delivered to a developing plant, the person in charge or an automatic device inserts the tool 15 into the rotary core 6 in a manner as shown in FIG. 1 whereby the projection 16 extends into the opening 10 and engages and deflects the projection 14 together with the pawl 11 so that the pallet 12 moves out of register with the teeth 13 of the sleeve 5. The film 20 is thereupon withdrawn in the direction indicated by the arrow D, either by hand or by an automatic withdrawing device. The projection 16 may constitute a wedge or a portion of a circular or partly circular mandrel. Once the entire film 20 is withdrawn from the chamber A, the magazine M can be delivered to a recharging station where the cover 1 is removed and a fresh supply of unexposed film inserted into the chamber B so that the innermost convolution of such fresh supply surrounds the stationary core 3.

In order to further reduce the likelihood of penetration of light into the chamber A by way of the opening 10, the outer cylindrical portion 8 of the core 6 defines with the sleeve 5 a labyrinth seal which practically eliminates the possibility of unnecessary exposure of once-exposed film 20 to additional light. A cylindrical portion 17 of the core 6 which is located between the projection 14 and the outer cylindrical portion 8 in substantial register with the sleeve 5 defines a labyrinth seal with the end wall 18 of the housing H to prevent penetration of light between the uppermost portion of the core 6 and the wall 18, as viewed in FIG. 1. A further seal which prevents penetration of light into the chamber A is formed by the suitably configured portion 19 of the core 6 and the wall 18 of the housing H. Still further, the magazine M comprises a preferably deformable closure 25 which normally overlies the opening 10 but can yield to the projection 16 during the insertion of tool 15 so as to enable the projection 16 to engage the projection 14 and to thereby flex the pawl 11. The flexible closure 25 may constitute a foil of opaque synthetic plastic material and can be secured to the cylindrical portion 7 or 17 or to the flange 9 of the core 6. The foil 25 and the labyrinth seals serve as effective barriers to prevent entry of dust or other foreign matter into the chamber A.

Figure 2:
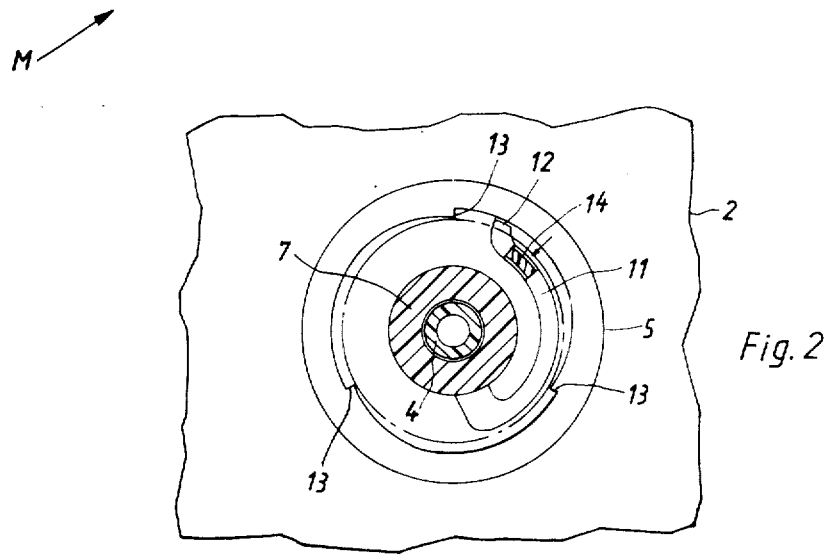
FIG. 2 is a horizontal sectional view as seen in the direction of arrows from the line II—II of FIG. 1.
Figure 3:
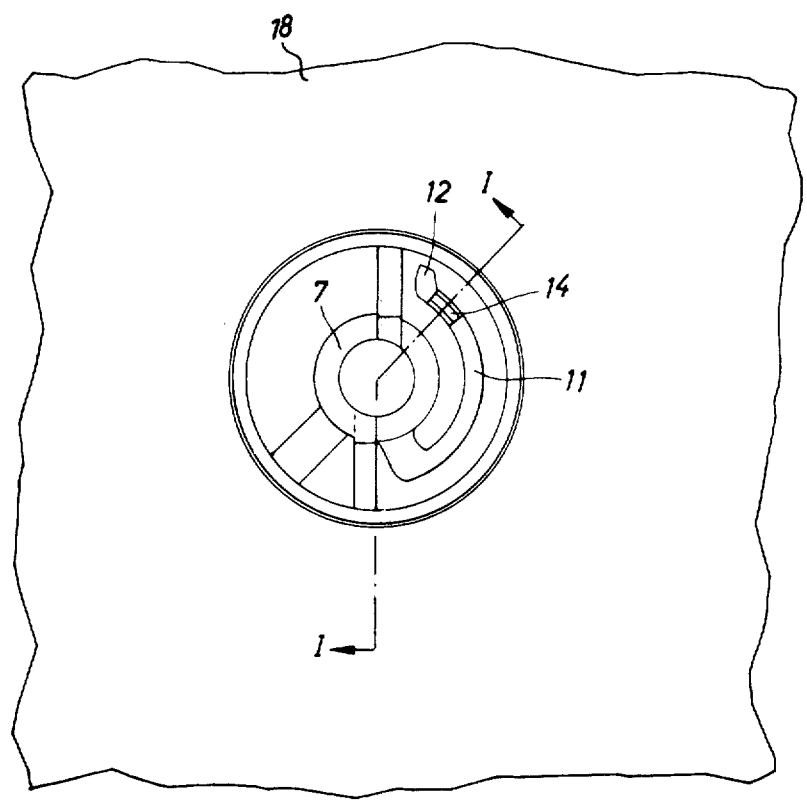
FIG. 3 is a fragmentary plan view of the structure shown in FIG. 1, with the tool for disengaging the elastic pawl from the internal teeth of the housing omitted.

In accordance with another feature of the invention, the elastic pawl 11 is configured and/or dimensioned in such a way that it can break when the core 6 is rotated counterclockwise, as viewed in FIG. 2. Thus, the pallet 12 of the pawl 11 can be moved against the nearest tooth 13 of the sleeve 5 with such a force that the pawl 11 is separated from the cylindrical portion 7 of the core 6 whereby the latter is free to rotate clockwise or counterclockwise. This renders it possible to employ the magazine M in motion picture cameras which are designed to make exposures with lap dissolve and wherein, to that end, the core 6 must be rotated in one direction to pay out the film during the making of normal exposures or during the making of exposures with fade-out effect, and to rotate in the opposite direction to pay out the frames which were exposed with fade-out effect so that such frames can be exposed for the second time but with fade-in effect. The just described motion picture cameras should not be confused with those wherein the making of exposures with lap dissolve is possible even though the core of the takeup reel cannot rotate in a direction to pay out the film, i.e., wherein the takeup reel is arrested during the making of exposures with fade-out effect so that the frames with such exposures are not collected by the takeup reel.

The pawl 11 may be intentionally weakened at one or more points (e.g., in the region immediately adjacent to the exterior of the cylindrical portion 7, in the region adjacent to the pallet 12, and/or in the region where the radially extending portion of the pawl 11 merges into the arcuate portion) to thereby insure that the breakage of the pawl is predictable and that such breakage does not necessitate the exertion of an excessive force. The weakening may be achieved by reducing the cross-sectional area of the selected portion or portions of the pawl 11, by importing to such selected portion or portions a configuration which is conducive to breakage when the pallet 12 bears against a tooth 13 and the purchaser of the magazine M forcibly rotates the core 6 in a counterclockwise direction, as viewed in FIG. 2, by providing the selected portion or portions of the pawl with one or more holes, slots or the like, and/or by resorting to a combination of two or more of the just outlined expedients.

The broken-off portion or portions of the pawl 11 remain confined in the space between the sleeve 5 on the one hand and portions 7, 8 of the core 6 on the other hand so that the broken-off portion or portions of the pawl cannot scratch the film in the chamber A and/or B and cannot materially interfere with rotation of the core 6 relative to the housing H. Such confinement of one or more fragments of the pawl 11 is attributed to the provision of a labyrinth seal between the space surrounding the cylindrical portion 7 and the chamber A.

It is clear that the improved magazine is susceptible of many additional modifications without departing from the spirit of the invention. For example, the magazine can employ a differently configured rotary core and/or a differently configured stationary core. Also, the stationary core can be replaced by a rotary core, and the stationary core need not serve as a bearing for the rotary core. Still further, the pawl may be secured to the portion 7 of the core 6 by means of a coupling which breaks or yields in response to forcible rotation of the core in a direction to pay out exposed film. Finally, it is equally within the purview of the invention to construct a portion of the sleeve 5 in such a way that its tooth or teeth 13 will break off in response to the application of a predetermined force which tends to rotate the core 6 counterclockwise, as viewed in FIG. 2. Thus, the blocking means of the improved magazine may be constructed and assembled in such a way that the pawl 11 and/or the sleeve 5 may become separated from the respective supporting part (core 6 and housing H) in order to allow the core 6 to rotate in either direction.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A rechargeable magazine for photographic roll film, comprising a housing defining a chamber for a supply of convoluted film, said housing having a first opening communicating with said chamber; a hollow core projecting into said chamber through said opening to support the convoluted film, said core being rotatably mounted in said housing and said housing comprising a member extending into said core; light excluding means surrounding said opening to prevent entry of light into said chamber between said core and said housing; means for blocking rotation of said core in one direction, said blocking means being located in said core and being mounted partly on said core and partly on said housing, said blocking means including a first portion which rotates with said core and a second portion provided on said member of said housing and located in the path of movement of said first portion to normally prevent rotation of said core in said one direction, at least one of said portions of said blocking means being movable relative to the other portion of said blocking means to an inoperative position in which said first portion is free to bypass said second portion to thus permit rotation of said core in said one direction, said core having a second opening disposed within said first opening and affording access to said one portion of said blocking means so as to enable a tool to reach and move said one portion to said inoperative position without any destruction of said housing and said core; and means for preventing entry of light into said chamber by way of said second opening.

2. A magazine as defined in claim 1, wherein said second portion of said blocking means comprises at least one internal tooth provided in said member of said housing and said first portion of said blocking means comprises an elastic pawl having a pallet which is moved into engagement with and is thereby arrested by said tooth in response to rotation of said core in said one direction, said pawl constituting said one portion of said blocking means.

3. A magazine as defined in claim 1, wherein said housing further comprises a wall having bearing means rotatably supporting said core and said core having a portion which surrounds said bearing means and has an external surface, said first portion of said blocking means being adjacent to said external surface of said portion of said core.

4. A magazine as defined in claim 3, wherein said member of said housing is an annular member provided on said wall and spacedly surrounding said external surface of said portion of said core.

5. A magazine as defined in claim 4, wherein said core further comprises a flange overlying said one portion of said blocking means and said second opening is provided in said flange.

6. A magazine as defined in claim 5, wherein said one portion of said blocking means is said first portion and said first portion comprises a projection extending into said second opening for engagement with a complementary projection of a tool upon insertion of the complementary projection into said second opening to thereby move said first portion of said blocking means out of register with said second portion of said blocking means.

7. A rechargeable magazine for photographic roll film, comprising a housing defining a chamber for a supply of convoluted film, said housing having a first opening communicating with said chamber; a hollow core projecting into said chamber through said first opening to support the convoluted film, said core being rotatably mounted in said housing; light excluding means surrounding said opening to prevent entry of light into said chamber between said core and said housing; means for blocking rotation of said core in one direction, said blocking means being located in said hollow core and being mounted partly on said core and partly on said housing, said core having a second opening which is accessible through said first opening and affords access to said blocking means; and an opaque member consisting of flexible material and being installed in said second opening to normally prevent entry of light into the region of said blocking means, said opaque member being deformable to thereby permit a tool to reach said blocking means.

* * * * *